United States Patent [19]

Wakabayashi et al.

[11] Patent Number: 5,958,567
[45] Date of Patent: Sep. 28, 1999

[54] POLYESTER ETHER FILM

[75] Inventors: Nobukatsu Wakabayashi; Katsuhiko Sugiura; Tatsuhiko Hatakeyama, all of Hiratsuka, Japan

[73] Assignee: Mitsubishi Engineering-Plastics Corporation, Tokyo, Japan

[21] Appl. No.: 09/203,061

[22] Filed: Dec. 1, 1998

[30] Foreign Application Priority Data

Dec. 3, 1997 [JP] Japan .................................. 9-332782

[51] Int. Cl.⁶ .............................. B32B 7/02; C08G 63/66
[52] U.S. Cl. ........................ 428/215; 528/300; 528/301; 528/302; 528/308; 528/308.6; 428/213; 428/220
[58] Field of Search ...................... 528/300, 301, 528/302, 308, 308.6; 428/213, 215, 220

[56] References Cited

U.S. PATENT DOCUMENTS

| | | | |
|---|---|---|---|
| 3,890,279 | 6/1975 | Wolfe, Jr. ................................. | 528/302 |
| 4,124,653 | 11/1978 | Whitlock ................................. | 525/173 |
| 4,524,165 | 6/1985 | Musser et al. .......................... | 524/99 |
| 5,447,783 | 9/1995 | Horn ....................................... | 428/216 |

*Primary Examiner*—Samuel A. Acquah
*Attorney, Agent, or Firm*—Dike, Bronstein, Roberts & Cushman, LLP; David G. Conlin

[57] ABSTRACT

The present invention relates to a polyester ether film comprising a polyester ether comprising a dicarboxylic acid moiety comprising principally terephthalic acid, its ester derivative or a mixture thereof, and a diol moiety comprising principally tetramethylene glycol and polytetramethylene oxide glycol, the percentage of the polytetramethylene oxide glycol residue in said polyester ether being 1 to 30% by weight based on the weight of said polyester ether.

7 Claims, No Drawings

POLYESTER ETHER FILM

BACKGROUND OF THE INVENTION

The present invention relates to a polyester ether film, and particularly it relates to a film comprising an aromatic polyester ether copolymer.

Since polyethylene terephthalate films and polytetramethylene terephthalate films are excellent in heat resistance, electrical insulating properties, gas barrier properties and scent retainability, they have been used for various applications by virtue of their advantageous properties, but they also have demerits such as poor flexibility, vulnerability to brake and liability to form pinholes. A solution to this problem is to blend flexible materials such as polyester elastomers in the film, but such flexible materials generally have poor compatibility with the film composition and cause whitening or opacification of the film even addition of a small quantity, so that it is unable to attain the desired flexibilization by addition of these materials. Also, the conventional terephthalic polyester films can hardly be used singly as a packaging material because of their high melting point and poor heat sealability, so that in order to make a satisfactory packaging material, it needs to form a composite film with a heat sealable resin such as polyethylenes through the medium of a costly adhesive.

A method for improving heat sealability of terephthalic polyester films is to use polyester films in which constituting polyester is produced by copolymerizing combinations of dicarboxylic acids other than terephthalic acid and glycols other than tetramethylene glycol and ethylene glycol, but these polyester films, which are made of amorphous polyesters, are subject to deterioration of gas barrier properties and scent retainability inherent to the normal terephthalic polyester films, and also lack flexibility.

As a result of present inventors' earnest studies to solve the above problem, it has been found that the above problem can be solved by specifying the percentage of the polytetramethylene oxide glycol residues in a polyester ether comprising as main components terephthalic acid, tetramethylene glycol and polytetramethylene oxide glycol. The present invention has been attained on the basis of the above finding.

SUMMARY OF THE INVENTION

An object of the present invention is to provide a polyester ether film having a good balance of heat resistance, flexibility and strength, and possessing excellent transparency, scent retainability, heat sealability and resistance to formation of pinholes.

To attain the above aim, in an aspect of the present invention, there is provided a polyester ether film comprising a polyester ether comprising a dicarboxylic acid moiety comprising principally terephthalic acid, its ester derivative or a mixture thereof, and a diol moiety comprising principally tetramethylene glycol and polytetramethylene oxide glycol, the percentage of the polytetramethylene oxide glycol residue in said polyester ether being 1 to 30% by weight based on the weight of said polyester ether.

DETAILED DESCRIPTION OF THE INVENTION

The present invention is described in further detail below.

The dicarboxylic acid moiety in the composition of the present invention comprises principally terephthalic acid and/or an ester derivative thereof. The percentage of terephthalic acid and its ester derivative is preferably 70 to 100 mol %, more preferably 90 to 100 mol % based on the total monomer unit.

Other components than terephthalic acid and its ester derivative, which may be present in the dicarboxylic acid moiety, include aromatic dicarboxylic acids such as isophthalic acid, phthalic acid, 2,6-naphthalene dicarboxylic acid, 1,5-naphthalene dicarboxylic acid, bis(4,4'-carboxyphenyl)methane, anthracene dicarboxylic acid and 4,4'-diphenylether dicarboxylic acid, alicyclic dicarboxylic acids such as 1,4-cyclohexane dicarboxylic acid and 4,4'-dicyclohexyl dicarboxylic acid, and aliphatic dicarboxylic acids such as adipic acid, sebacic acid, azelaic acid and dimer acid.

The percentage of the aromatic dicarboxylic acid in the dicarboxylic acid moiety is preferably not less than 70 mol %, more preferably not less than 90 mol % based on the total monomer unit in view of mechanical properties, gas barrier properties and heat resistance.

The glycol moiety in the composition of the present invention comprises principally tetramethylene glycol and polytetramethylene oxide glycol. The percentage of tetramethylene glycol and polytetramethylene oxide glycol in the glycol moiety is preferably 70 to 100 mol %, more preferably 90 to 100 mol % based on the total monomer unit.

Other components than tetramethylene glycol and polytetramethylene oxide glycol, which may be present in the glycol moiety, include $C_2$–$C_{20}$ aliphatic or alicyclic diols and bisphenol derivatives, such as ethylene glycol, propylene glycol, 1,5-pentanediol, 1,6-hexanediol, neopentyl glycol, decamethylene glycol, cyclohexane dimethanol, 4,4'-dicyclohexyl hydroxymethane, 4,4'-dicyclohexyl hydroxypropane, ethylene oxide-added diol of bisphenol A, polyethylene oxide glycol, polypropylene oxide glycol and mixtures thereof. Triols such as glycerin and trimethylol propane may be used.

The polyester ether according to the present invention comprises a dicarboxylic acid moiety comprising principally terephthalic acid and/or its ester derivative and a diol moiety comprising principally tetramethylene glycol and polytetramethylene oxide glycol.

The percentage of the polytetramethylene oxide glycol residue in the polyester ether is 1 to 30% by weight. When the percentage of the polytetramethylene oxide glycol residue is less than 1% by weight, the produced composition is unsatisfactory in heat sealability, and when the percentage exceeds 30% by weight, the produced composition is low in heat resistance and the film tackiness becomes too high, making it difficult to carry out the film forming operations. The percentage of the polytetramethylene oxide glycol residue in the polyester ether is preferably 3 to 25% by weight, more preferably 5 to 20% by weight.

The number-average molecular weight of the polytetramethylene oxide glycol in the composition of the present invention is preferably 300 to 5,000, more preferably 500 to 2,500, still more preferably 700 to 2,000. When it is less than 300, preferred flexibilization of the composition may not be achieved, and when it exceeds 5,000, the composition tends to lower in heat resistance. The number-average molecular weight of polytetramethylene oxide glycol is measured by reacting excess phthalic anhydride with a sample of polytetramethylene oxide glycol, determining the amount of the residual phthalic anhydride and calculating the hydroxy equivalent to one gram of the sample.

The melting point of the polyester ether in the present invention, measured as melting peak temperature by the DSC method at a heating rate of 20° C./min, is preferably 200 to 225° C. The melt viscosity of the polyester ether of the present invention, as measured at 250° C. and a shear rate of 100 sec$^{-1}$, is preferably 1,000 to 20,000 poises, more preferably 2,000 to 15,000 poises. When the melt viscosity is less than 1000 poises, extrusion moldability and flexibility of the film may be poor. When the melt viscosity is more than 20000 poises, it may be difficult to carry out the film forming operations.

As for the dynamic properties of the polyester ether, its bending modulus measured as a ¼" test piece according to ASTM D-790, is preferably 2,500 to 18,000 kg/cm$^2$, more preferably 3,000 to 15,000 kg/cm$^2$, and its Young's modulus measured with a 25 μm thick non-stretched film is preferably 2,000 to 16,000 kg/cm$^2$, more preferably 3,000 to 10,000 kg/m$^2$.

The polyester ester of the present invention can be produced by the conventional condensation polymerization methods well known in the art. For instance, tetramethylene glycol and polytetramethylene oxide glycol are added in the prescribed ratios to a dimethyl ester of terephthalic acid and reacted under heating at about 150 to 250° C. in the presence of a catalyst such as an alcoholate, chloride or oxide of a metal such as tin, titanium, zinc, manganese or germanium, while evaporating methanol which is a by-product in the ester exchange reaction. Then the reaction mixture is polycondensed by heating at 200 to 280° C. under a reduced pressure of not more than 10 mmHg to produce the objective polyester ether. A heat stabilizer and other necessary substances may be added in the reaction step.

In this case, polytetramethylene oxide glycol may be added first, with tetramethylene glycol added after ester exchange, and the ester exchange is allowed to continue for further polycondensation. It is also possible to directly polycondensate tetramethylene glycol and polytetramethylene oxide glycol with terephthalic acid. The resinous pellets of the polyester ether obtained by melt polycondensation in the manner described above may be subjected to a high temperature (170 to 210° C.) heat treatment in an inert gas stream (solid-phase polymerization method) to increase the molecular weight of the polyester ether.

The polyester ether film according to the present invention is a film molded from a polyester ether comprising a dicarboxylic acid moiety comprising principally terephthalic acid or its ester derivative and a diol moiety comprising principally tetramethylene glycol and polytetramethylene oxide glycol, wherein the percentage of the said polytetramethylene oxide glycol is 1 to 30% by weight based on the polyester ether.

The polyester ether film of the present invention is preferably a non-oriented film or a monoaxially or biaxially oriented film, and its thickness is preferably 5 to 300 μm, more preferably 10 to 250 μm.

In the polyester ether film of the present invention, other components, for example, an antioxidant such as phosphites and hindered phenols; a heat stabilizer; an ultraviolet absorber such as benzotriazole compounds and benzophenone compounds; a light stabilizer such as hindered amine compounds; a nucleating agent; a plasticizer; a colorant; and the like may be added. Further, a slipperiness-imparting agent, a lubricant and the like may be added as required for improving workability in the film forming operations and fabricating of the film. The slipperiness-imparting agents usable in the present invention include inorganic microfine particles of silica, talc, kaolin, calcium carbonate and the like; and microfine particles or crosslinked microfine particles of organic polymers such as poly(meth)acrylic resins, polystyrene resins and polytetrafluoroethylene resins. The particle size of these slipperiness-imparting agents is preferably 0.1 to 10 μm.

A T-die film-forming machine or an inflation film-forming machine may be used for forming the polyester ether film of the present invention. In case of using a T-die film-forming machine, the resin material is extruded at a cylinder temperature of 220 to 260° C. and molded into a film with rolls at 5 to 90° C. In this case, chill rolls for mat working may be used for improving slip properties of the film. Also, the film may be subjected to a corona surface-treatment to improve laminate adhesion. For obtaining an oriented film, the produced film is monoaxially oriented or biaxially oriented successively or simultaneously in an atmosphere of from normal temperature to up to about 70° C. and then heat-set at 180 to 220° C.

In the case of inflation method, the molten resin is extruded from a circular die at the same cylinder temperature as in the above case, then blown-up ratio of about 1.2 to 1.7 by air cooling or water cooling method, and then cooled and taken up. Water-cooling method is preferred for producing the polyether ester film according to the present invention. The known co-extrusion methods can be applied for obtaining a multilayer film with other resins, regardless of the molding method used.

The polyester ester film of the present invention offers a good balance of flexibility and strength, and also has many excellent properties such as transparency, scent retainability, heat sealability, resistance to formation of pinholes, heat resistance, electrical insulation and gas barrier properties, so that it finds many useful applications such as insulating films, food packaging films, heat-resistant film for electronic oven, heat-shrinkable labels, stretched films, protective films for stationery, tools, machine parts, etc., various types of laminated film and tube which are required to have flexibility (toothpaste, waxes, etc.), scent-retaining films for toiletry, cosmetics and medical uses (liniment packages), and film for non-adsorptive paper packs for juices, liquors, etc.

EXAMPLES

The present invention is further illustrated by showing the examples thereof, but these examples, however, are merely intended to be illustrative and not to be construed as limiting the scope of the invention.

The film evaluation methods used in the Examples and Comparative Examples are set forth below.

(1) Young's Modulus, Tensile Strength and Tensile Elongation

A test piece was cut out 15 mm wide in the machine direction (MD) and 100 mm long in the direction (TD) orthogonal to the machine direction from the sample film, and its Young's modulus, tensile strength and tensile elongation were measured according to ASTM D-882 under the conditions of 23° C., chuck interval of 50 mm and pulling rate of 200 mm/min. In the present invention, it is preferred that Young's modulus is 2000 to 16000 kg/cm$^2$, tensile strength is 150 to 600 kg/cm$^2$, and tensile elongation is not less than 50%.

(2) Heat Sealing Strength and Elongation at Break

A 250 mm wide and 200 mm long piece was cut out from the sample film and folded double in the lengthwise direction, and a portion positioned about 20 mm from the folded side was sealed by a 300 mm wide hot plate heat sealer with a 10 mm sealing edge under a pressure of 2 kg/cm$^2$ at 210° C. for one second. A 15 mm wide test piece was cut out from the sealed film and its heat sealing strength was measured at a pulling rate of 200 mm/min, the maximum value of strength being shown here. Elongation at break was also determined. The pattern of break in this test was observed. In the present invention, it is preferred that heat sealing strength is not less than 500 g/15 mm and elongation at break is not less than 100%.

(3) Haze

Five 60×60 mm test pieces were cut out in the take up width direction from the sample film, and their haze was measured by a hazeometer. The average of the measurements of the five test pieces was calculated. In the present invention, it is preferred that haze is not more than 5.

(4) Flexing Resistance

A 500-cycle pinhole test was conducted according to the Mil-B-131C method under the conditions of 23° C. and 65% RH. In the present invention, it is preferred that the number of pinholes is not more than 5.

(5) Melt Viscosity

Measured at 250° C. and a shear rate of 100 sec$^{-1}$. In the present invention, it is preferred that melt viscosity is 2000 to 15000 poise.

(6) Bending Modulus

Measured with a ¼" test piece according to ASTM D790. In the present invention, it is preferred that bending modulus is 2500 to 18000 kg/cm$^2$.

Referential Example 1 (Synthesis of Polyester Ether (a))

801 parts by weight of dimethyl terephthalate, 435 parts by weight of 1,4-tetramethylene glycol, 100 parts by weight of polytetramethylene oxide glycol having a number-average molecular weight of about 1,000 and 0.30 part by weight of tetrabutyl titanate as catalyst were supplied to a reactor equipped with a stirrer, a thermometer, a gas replacing port and a distillation column. After nitrogen replacement, the mixture was heated to 200° C. over a period of 40 minutes and maintained at 200° C. for 2 hours, allowing evaporation of methanol. Then 1.7 parts by weight of pentaerythrityl-tetrakis[3-(3,5-di-t-butyl-4-hydroxyphenyl)propionate] and 0.07 part by weight of sodium phosphite monohydrate were added to the reactor, and the mixture was heated to 240° C. over a period of 60 minutes while the pressure in the reaction system was gradually reduced till the degree of vacuum became lower than 3 Torr. This situation was maintained for 2 hours. The produced polymer was extruded into water from a die opening, taken up and cut into pellets.

The pellets were dried at 80° C. to a moisture content of less than 100 ppm and heat treated at 200° C. in an inert gas atmosphere to obtain a polyester ether (a). The percentage of polytetramethylene oxide glycol residue in the polyester ether (a) was 10% by weight. This polyester ether (a) also had a melt viscosity of 3,800 poises, a melting point of 222° C. and a bending modulus of 8,400 kg/cm$^2$.

Referential Example 2 (Synthesis of Polyester Ether (b))

The procedure of Referential Example 1 was carried out using 507 parts by weight of dimethyl terephthalate, 272 parts by weight of 1,4-butanediol and 100 parts by weight of polytetramethylene oxide glycol having a number-average molecular weight of about 1,000 as starting materials to obtain a polyester ether (b). The percentage of polytetramethylene oxide glycol residue in the obtained polyester ether (b) was 15% by weight. The polyester ether (b) had a melt viscosity of 3,500 poises, a melting point of 219° C. and a bending modulus of 5,400 kg/cm$^2$.

Referential Example 3 (Synthesis of Polyester Ether (c))

The procedure of Referential Example 1 was carried out using 360 parts by weight of dimethyl terephthalate, 190 parts by weight of 1,4-butanediol and 100 parts by weight of polytetramethylene oxide glycol having a number-average molecular weight of about 1,000 as starting materials to obtain a polyester ether (c). The percentage of polytetramethylene oxide glycol residue in the produced polyester ether (c) was 20% by weight. The polyester ether (c) had a melt viscosity of 3,000 poises, a melting point of 216° C. and a bending modulus of 4,400 kg/cm$^2$.

Referential Example 4 (Synthesis of Polyester Ether (d))

The procedure of Referential Example 1 was carried out using 140.2 parts by weight of dimethyl terephthalate, 92.8 parts by weight of 1,4-butanediol and 100 parts by weight of polytetramethylene oxide glycol having a number-average molecular weight of about 1,000 as starting materials to obtain a polyester ether (d). The percentage of polytetramethylene oxide glycol residue in the obtained polyester ether (d) was 40% by weight. The polyester ether (d) had a melt viscosity of 2,800 poises, a melting point of 196° C. and a bending modulus of 1,000 kg/cm$^2$.

Example 1

The polyether ester (a) was dried at 120° C. for 8 hours and then kneaded and extruded at 250° C. using a 40 φmm, L/D=22 extruder at a T-die temperature of 230° C. and a casting roll temperature of 25° C. to obtain a polyester ether film A having a thickness of 25 μm. This substantially non-oriented film was subjected to the various evaluation tests. The results are shown in Table 1. With reference to the mode of rupture in the heat sealing strength test, break of the film took place at the parts other than the heat sealed portion, indicating high sealing strength of the film.

Example 2

The same procedure as defined in Example 1 was conducted using the polyester ether (b) to obtain a 25 μm thick polyester ether film B, and it was subjected to the same evaluation tests as defined in Example 1. The results are shown in Table 1. In the heat sealing strength test, film break occurred at the parts other than the heat sealed portion, demonstrating high sealing strength of the film.

Example 3

The same procedure as defined in Example 1 was conducted using the polyester ether (c) to obtain a 25 μm thick polyester ether film C, and it was subjected to the same evaluation tests as defined in Example 1. The results are shown in Table 1. In the heat sealing strength test, break of the film was observed at the parts other than the heat sealed portion, which demonstrated high sealing strength of the film.

Example 4

The same procedure as defined in Example 1 was conducted using the polyester ether (c) to obtain a 95 μm thick polyester ether film C. Then, the film was biaxially stretched 2.5 times using a stretching machine at the temperature of 50° C. and heat-set for one minute at 220° C., to obtain a 15 μm thick biaxially oriented polyester ether film D. The obtained film was subjected to the same evaluation tests as defined in Example 1. The results are shown in Table 1. In the heat sealing strength test, break of the film was observed at the parts other than the heat sealed portion, which demonstrated high sealing strength of the film.

Comparative Example 1

The same procedure as defined in claim 1 was conducted except for use of polytetramethylene terephthalate and setting of the kneading/extruding temperature at 270° C. and T-die temperature at 260° C. to obtain a 25 μm thick PBT film, and it was subjected to the same evaluation tests as conducted in Example 1. The results are shown in Table 1. In the heat sealing test, brittle fracture was observed at the end of the heat sealed portion. The bending modulus of the polytetramethylene terephthalate was 24,000 kg/cm$^2$.

Comparative Example 2

The same procedure as defined in Example 4 was conducted except for use of polyethylene terephthalate and stretching of the film in a 50° C. atmosphere to obtain a 15 μm thick, biaxially oriented PET film, and it was subjected to the same evaluation tests as conducted in Example 1. The results are shown in Table 1. The bending modulus of the polyethylene terephthalate was 28,000 kg/cm$^2$.

Comparative Example 3

It was tried to form a 25 μm thick film by conducting the same procedure as defined in Example 1 except for use of the polyester ether (d) and setting of the kneading/extruding temperature at 230° C. and T-die temperature at 260° C., but it was unable to form the film because of too high tackiness.

TABLE 1

|  | Example 1 | Example 2 | Example 3 | Example 4 | Comp. Example 1 | Comp. Example 2 |
|---|---|---|---|---|---|---|
| Young's modulus (kg/cm$^2$) | 6600 | 4500 | 3500 | 5300 | 18000 | 40000 |
| Tensile strength (kg/cm$^2$) | 710 | 700 | 690 | 1200 | 850 | 2400 |
| Tensile elongation (%) | 550 | 580 | 630 | 300 | 440 | 110 |
| Haze (%) | 0.6 | 0.7 | 0.8 | 0.2 | 0.4 | 4 |
| Heat-seal strength (g/15 mm) | 1400 | 1300 | 1200 | 860 | 710 | Unable to heat-seal |
| Elongation at break (%) | 290 | 320 | 350 | 180 | <10 | — |
| Flexing resistance (number of pinholes) | 1 | 0 | 0 | 2 | 5 | 12 |

Example 5 (Evaluation of Scent-retainability)

The 150×150 mm package containers were made using the 25 μm thick polyester ether film A used in Example 1, the 25 μm thick PBT film used in Comparative Example 1 and a low-density polyethylene film (LDPE film), and the test materials shown in Table 2 were packed in the respective packaging containers and kept therein for one week with the containers being kept sealed. Thereafter, scent retainability of the films was evaluated by a sensory test and rated as follows:

5: very excellent
4: excellent
3: good
2: rather bad
1: bad

TABLE 2

|  | Polyester ether film | PBT film | LDPE film |
|---|---|---|---|
| Coffee | 5 | 5 | 1 |
| Black tea | 5 | 5 | 1 |
| Curry | 3 | 3 | 1 |
| Lemon | 4 | 4 | 1 |
| Garlic | 4 | 4 | 1 |

What is claimed is:

1. A polyester ether film comprising a polyester ether comprising a dicarboxylic acid moiety comprising principally terephthalic acid, its ester derivative or a mixture thereof, and a diol moiety comprising principally tetramethylene glycol and polytetramethylene oxide glycol, the percentage of the polytetramethylene oxide glycol residue in said polyester ether being 1 to 30% by weight based on the weight of said polyester ether.

2. A polyester ether film according to claim 1, wherein the number-average molecular weight of the polytetramethylene oxide glycol is 500 to 6,000.

3. A polyester ether film according to claim 1, wherein the melting point of the polyester ether is 200 to 225° C.

4. A polyester ether film according to claim 1, wherein the melt viscosity of the polyester ether is 1,000 to 20,000 poises as measured at 250° C and a shear rate of 100 $sec^{-1}$.

5. A polyester ether film according to claim 1, wherein the bending modulus of the polyester ether is 2,500 to 18,000 $kg/cm^2$ as measured with a ¼" test piece according to ASTM D790.

6. A polyester ether film according to claim 1, wherein the thickness of the polyester ether film is 5 to 300 μm.

7. A polyester ether film according to claim 1, wherein the polyester ether film is a non-oriented film or a oriented film which has been monoaxially or biaxially stretched.

* * * * *